(12) United States Patent
Hodges

(10) Patent No.: US 11,619,165 B1
(45) Date of Patent: *Apr. 4, 2023

(54) ROTARY COMBUSTION ENGINE WITH INTEGRATED MULTISTAGE FUEL SYSTEM

(71) Applicant: William Todd Hodges, Yorktown, VA (US)

(72) Inventor: William Todd Hodges, Yorktown, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/991,230

(22) Filed: Nov. 21, 2022

Related U.S. Application Data

(63) Continuation-in-part of application No. 17/734,144, filed on May 2, 2022, now Pat. No. 11,506,116,
(Continued)

(51) Int. Cl.
*F02B 53/12* (2006.01)
*F02B 53/00* (2006.01)
(Continued)

(52) U.S. Cl.
CPC .............. *F02B 53/10* (2013.01); *F02B 53/04* (2013.01); *F02B 2053/005* (2013.01)

(58) Field of Classification Search
CPC ............ F02B 53/02; F02B 1/04; F02B 53/12; F02B 2053/005; F02B 2075/125
(Continued)

(56) References Cited

U.S. PATENT DOCUMENTS 3,696,796 A * 10/1972 Gavrun .................... F02B 55/14
123/205
3,703,885 A * 11/1972 Feller ...................... F02B 55/14
123/205
3,929,106 A * 12/1975 Scott ....................... F02B 53/04
123/205
(Continued)

FOREIGN PATENT DOCUMENTS

CN        209925084 U     1/2020
CN        112196667 A     1/2021
(Continued)

OTHER PUBLICATIONS

Wesley, "How Wankel Rotary Engines Work", Babbler, us(online), Nov. 10, 2017; pp. 1-2; Nov. 10, 2017; Retrieved from the Internet: <https://web.babbler.us/document/show/how-wankel-rotary-engines-work#/>.
(Continued)

*Primary Examiner* — J. Todd Newton
(74) *Attorney, Agent, or Firm* — Invention To Patent Services; Alex Hobson

(57) ABSTRACT

A rotary combustion engine, such as a Wankel engine has a rotor with a rotor pocket for receiving air-fuel mixture that is combusted therein to propel the rotor within the housing. Rotor air channels extend from an inlet that is configured in the compression chamber to an outlet configured in the rotor pocket to deliver compressed air-fuel mixture to said rotor pocket. The rotor air channels have an open portion, open on the face of the rotor and a closed portion extending as a
(Continued)

conduit into the rotor to the rotor pocket. Fuel may be delivered to the rotor air channel from a rotor-gear fuel conduit that receives fuel from the fixed gear or a side-wall fuel conduit that receives fuel from a housing side-wall injector through a side-wall fuel transfer port. Rotor air channels may be configured to direct air-fuel streams to intercept one another to enhance combustion.

22 Claims, 6 Drawing Sheets

Related U.S. Application Data which is a continuation-in-part of application No. PCT/US2021/057942, filed on Nov. 3, 2021, and a continuation-in-part of application No. 17/128,080, filed on Dec. 19, 2020, now Pat. No. 11,365,706.

(60) Provisional application No. 63/271,077, filed on Oct. 22, 2021, provisional application No. 63/109,596, filed on Nov. 4, 2020.

(51) Int. Cl.
*F02B 53/10* (2006.01)
*F02B 53/04* (2006.01)
*F02B 53/02* (2006.01)

(58) Field of Classification Search
USPC ............... 123/18 A, 18 R, 43 A, 45 A, 45 R, 123/200–249; 418/140, 187, 61.1; 60/39.55
See application file for complete search history.

(56) References Cited

U.S. PATENT DOCUMENTS

| | | | |
|---|---|---|---|
| 3,941,098 A * | 3/1976 | Roberts | F02B 53/10 418/188 |
| 4,055,154 A * | 10/1977 | Kono | F02B 53/10 123/475 |
| 4,072,131 A | 2/1978 | Pentel | |
| 5,168,846 A * | 12/1992 | Paul | F02B 53/06 123/299 |
| 8,312,859 B2 | 11/2012 | Rom et al. | |
| 9,057,321 B2 | 6/2015 | Reitz et al. | |
| 9,528,434 B1 | 12/2016 | Thomassin et al. | |
| 9,677,534 B2 | 6/2017 | Ikeda | |
| 10,145,291 B1 | 12/2018 | Thomassin et al. | |
| 10,247,092 B2 | 4/2019 | Fontaine et al. | |
| 10,458,325 B2 | 10/2019 | Gaul et al. | |
| 10,570,789 B2 | 2/2020 | Plamondon et al. | |
| 2017/0335795 A1 | 11/2017 | Klemen et al. | |
| 2018/0187592 A1 | 7/2018 | Davenport et al. | |
| 2019/0162108 A1 | 5/2019 | Dussault et al. | |

FOREIGN PATENT DOCUMENTS

| | | |
|---|---|---|
| GB | 1468087 A | 3/1977 |
| GB | 2185073 A | 1/1986 |
| WO | 2006061429 A1 | 6/2006 |
| WO | 2011092365 A1 | 4/2011 |
| WO | 2017001875 A1 | 1/2017 |

OTHER PUBLICATIONS

USPTO, International Search Report and Written Opinion on Patentabilty, PCT/US22/27454, dated Jul. 28, 2022.

* cited by examiner

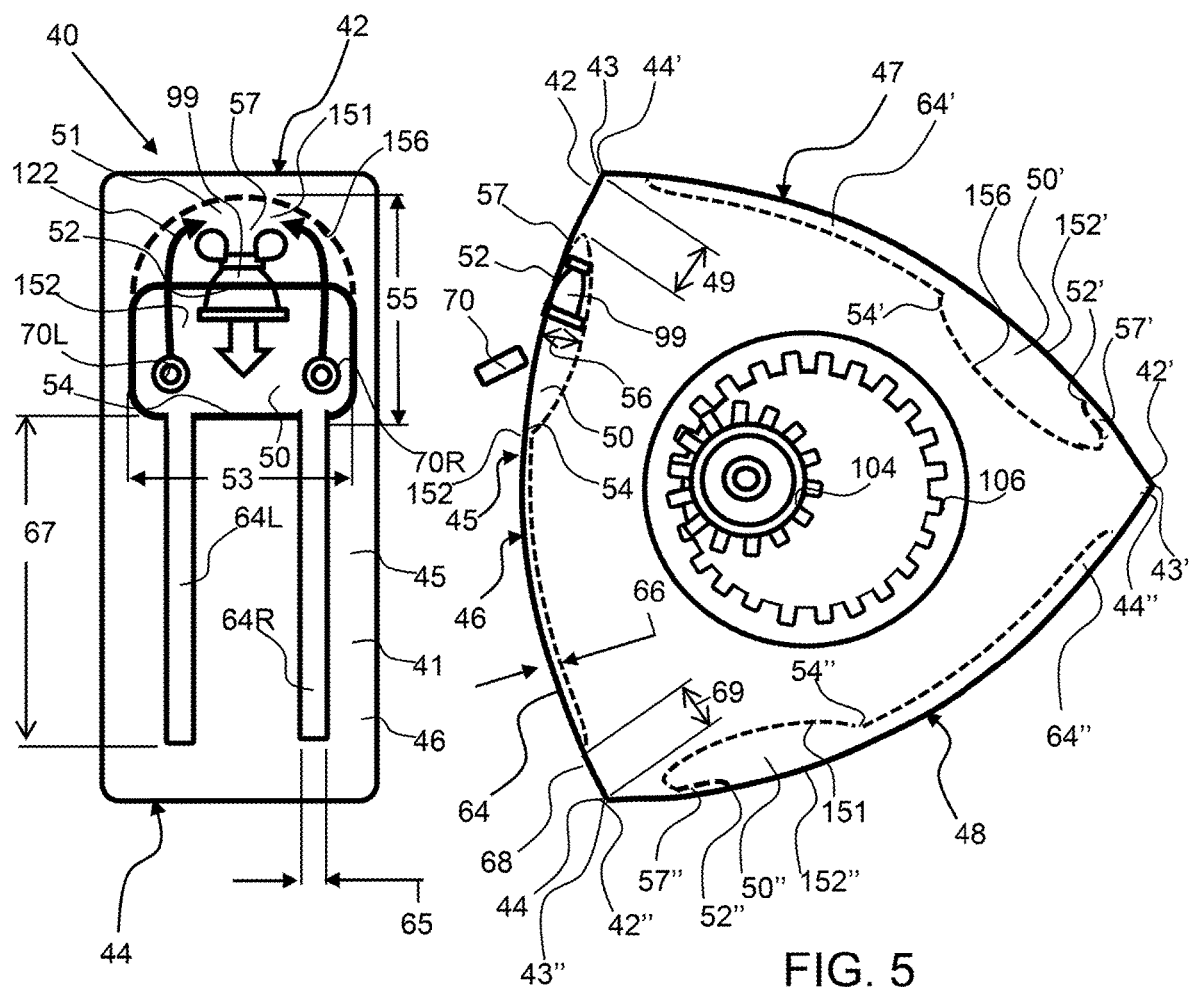
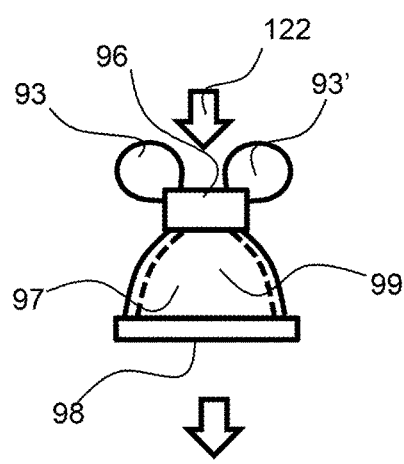
FIG. 4
FIG. 5
FIG. 6

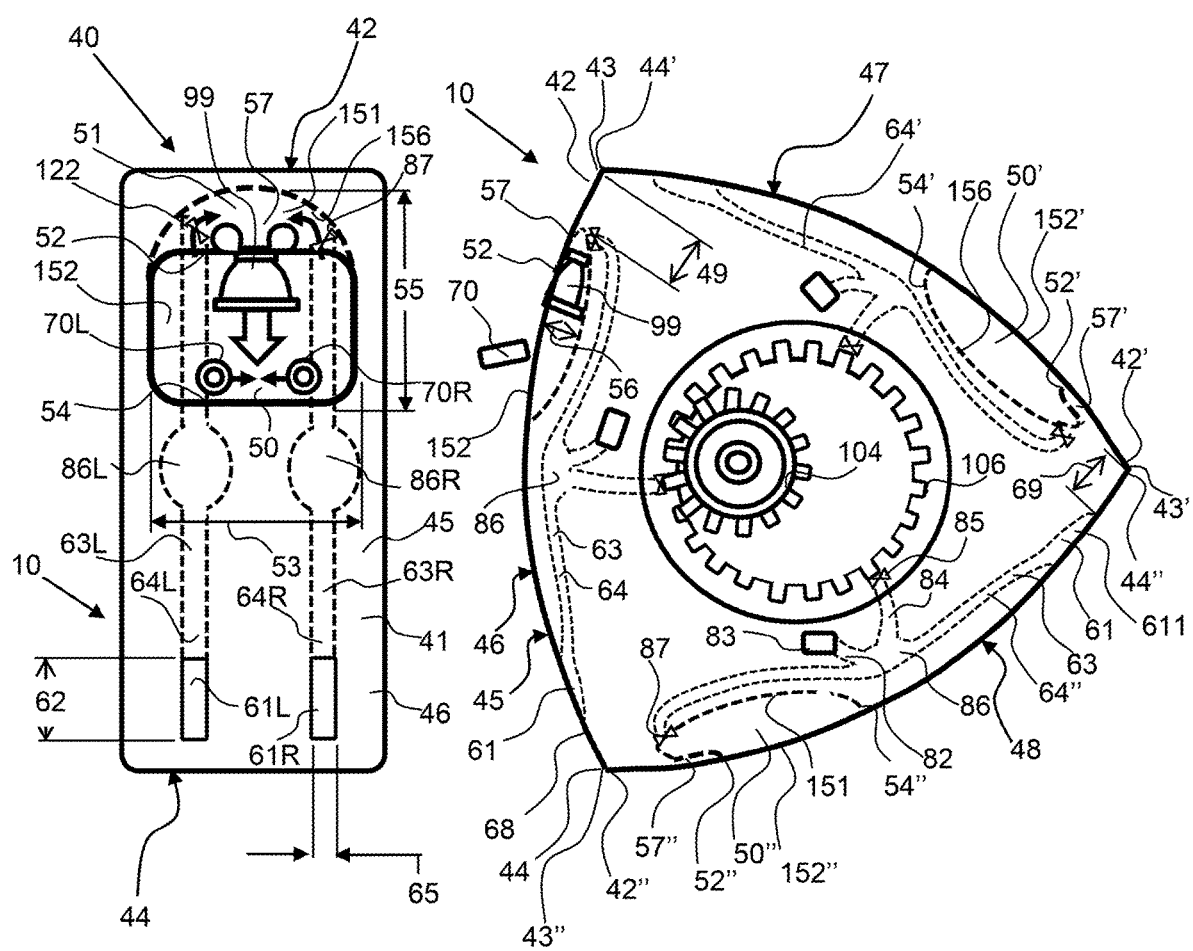

ROTARY COMBUSTION ENGINE WITH INTEGRATED MULTISTAGE FUEL SYSTEM

CROSS REFERENCE TO RELATED APPLICATIONS

This application is a continuation in part of U.S. application Ser. No. 17/734,144, filed on May 2, 2022 and currently pending, which is a continuation in part of U.S. application Ser. No. 17/128,080, filed on Dec. 19, 2020 and now issued as U.S. Pat. No. 11,365,706 on Jun. 21, 2022, which claims the benefit of priority to U.S. provisional patent application No. 63/109,596, filed on Nov. 4, 2020, and U.S. patent application Ser. No. 17/734,144 is a continuation in part of PCT application No. PCT/US21/57942, filed on Nov. 3, 2021, and U.S. patent application Ser. No. 17/734,144 also claims the benefit of priority to U.S. provisional patent application No. 63/271,077, filed on Oct. 22, 2021; the entirety all applications are hereby incorporated by reference herein

BACKGROUND OF THE INVENTION

Field of the Invention

The invention relates to a rotary combustion engine, such as a Wankel engine having an eccentric rotor and having an intake spray injector that sprays fuel onto the rotor in the intake chamber to cool the rotor, air-fuel conduits configured in the rotor that extends from the compression chamber to a rotor pocket to deliver compressed air-fuel mixture for combustion, and said shaped pocket configured with a nozzle to receive the air-fuel mixture and combust said mixture to allow the use of multifuels and enhance torque about the crankshaft to improve the efficiency.

Background

Rotary combustion engines, such as a Wankel engine, provide power through the formation of an intake chamber, compression chamber, ignition-combustion chamber and exhaust chamber via the eccentrically rotating rotor within the housing. Rotary combustion engines typically have higher specific fuel consumption than piston engines of similar size. The rotor can become too hot which can lead to damage and failure of the engine. Multifuel engines are more adaptable and useful in the field. There are organizations that require multifuel engines.

SUMMARY OF THE INVENTION

The invention is directed to a rotary combustion engine, such as a Wankel engine having an eccentric rotor and having an intake spray injector that sprays fuel at a lower pressure than the ignition injector. The intake spray injector(s) sprays fuel onto the rotor in the intake chamber to cool the rotor and a supplemental air-fuel conduit that extends from the compression chamber to the ignition-combustion chamber to deliver compressed air-fuel mixture to the ignition-combustion chamber for combustion. The introduction of liquid fuel into the intake chamber and particularly delivered to the surface of the rotor may effectively cool the rotor through evaporative cooling. The rotor may have a rotor pocket for receiving the fuel from the intake spray injector and the rotor pocket may be the initial chamber for ignition and combustion. One or more intake spray injectors may be configured to deliver liquid fuel onto the rotor surface within the intake chamber. The supplemental air-fuel conduit may deliver the compressed air-fuel mixture from the compression chamber to the ignition-combustion chamber through an ignition injector or injectors. A one-way check valve may prevent any combusting gases from flowing back into and through the supplemental air-fuel conduit to the compression chamber, as this would produce negative work. The rotor pocket may be shaped in a fashion that creates a thrust from combusting gasses that helps drive the rotor in the direction of rotation.

An intake spray injector is significantly less expensive than an ignition injector and may be configured to spray the liquid fuel through an intake port and/or through the housing and directly onto the rotor face and into the rotor pocket when in the intake chamber. A plurality of intake spray injectors may be configured within the intake chamber to effectively dispense liquid fuel onto the rotor surface for effective cooling, such as two or more, three or more, four or more and any range between and including the number of intake spray injectors provided. The intake spray injectors may be peripheral injectors configured around the outer periphery or circumference of the housing. The intake spray injectors may also be sidewall spray injectors however. The intake spray injectors may be configured to inject sequentially into the rotor pocket as it rotates within the housing, such as within the intake chamber. The liquid fuel may be dispensed into the rotor pocket and may be used for initial ignition of the air-fuel mixture in the ignition-combustion chamber. Also, the rotor pocket may become hot from the combustion therein and spray injection of liquid fuel into the rotor pocket may effectively cool the rotor pocket by evaporation.

The intake spray injectors may be configured to dispense a small amount of fuel to cool the rotor, but not enough to cause auto-ignition. Auto-ignition of hydrocarbons in compression ignition engines is a chain-branching process, including the four reaction classes of chain initiation, chain propagation, chain branching, and chain termination. After the start of injection, ignition occurs after a certain induction time, the ignition delay. During this time delay, fuel evaporates until a first region of ignitable mixture with an air-fuel ratio of $0.5<\lambda<0.7$ is formed. Furthermore, the chemical reactions in this region have to produce enough fuel radicals in order to start the combustion process. The chain initiation produces these first radicals from stable fuel molecules. This reaction proceeds slowly, because stable molecules are involved in the process. Then, if a certain radical concentration is reached, the chain propagation and the chain branching reactions form additional radicals. The air-fuel ratio of $0.5<\lambda<0.7$ is described in Carsten Baumgarten, Mixture Formation in Internal Combustion Engines, Springer-Verlag publishing, 2006, hereby incorporated by reference herein.

This chain of events is controlled by a number of parameters, such as, injection pressure, injection timing, nozzle geometry, pocket shape, surface characteristics of the materials in the pocket, injector tip temperature and other parameters. These low-pressure injection parameters will be adjusted so that $\lambda$ (lambda) is below 0.5 or above 0.7 so that autoignition does not occur. At the proper time the high-pressure fuel delivery system of the rotary combustion engine may be configured to deliver an additional air-fuel mixture into the pocket that is proximal to the leading edge of the rotor face, such that X will be in the range of 0.5 to 0.7 and autoignition will occur.

The fuel sprayed into the intake chamber by the intake spray injectors evaporates off the rotor surface and mixes with air introduced through the intake port to produce an air-fuel mixture that is compressed in the compression chamber. Some of this highly compressed air-fuel mixture may pass from the compression chamber to the ignition-combustion chamber via the supplemental air-fuel conduit. This supplemental air-fuel conduit may be coupled with a high-pressure air blast injector that injects additional fuel into the ignition-combustion chamber. An ignitor may initiate ignition of the fuel mixture in the ignition-combustion chamber to produce work and propel the rotor about the fixed gear to start the engine before normal operating temperatures are achieved.

The rotor pocket is a recess into the exterior surface of the rotor face that may contain the air-fuel mixture from the intake chamber. The rotor pocket may be configured proximal to the leading edge of each one of the rotor faces and may be offset from the leading edge by a pocket offset distance. A rotor pocket may have a pocket cup configured under a pocket flange extending along the rotor face. The pocket flange may extend over the pocket cup toward the trailing edge of the rotor face. The pocket cup may be configured on the leading edge of the rotor pocket or proximal to the leading edge of the rotor face.

In addition, the rotary combustion engine may have a thrust nozzle configured in the rotor pocket that directs combustion gasses through the thrust nozzle to produce a propelling force on the rotor. The thrust nozzle may be configured proximal to the leading edge of the rotor pocket and at least partially under the pocket flange and partially within the pocket cup. The thrust nozzle may have an expanding conduit that expands in cross-sectional area from an inlet to an outlet and this may be configured with the inlet more forward to the leading edge of the rotor than the outlet such that the combustion gasses exit the nozzle in a direction counter to the rotation of the rotor, thus creating a thrust force in the direction of rotation of the rotor.

The rotor pocket volume will be equal to or smaller in size than that needed to give an engine compression ratio of five or greater, six or greater, seven or greater regardless of the e/R ratio (eccentricity/generating radius ratio) of the Wankel engine. The air-fuel mixture within the rotor pocket may be compressed in the compression chamber and subsequently rotate to form a portion of the ignition-combustion chamber. One or more ignition injectors may be configured to inject the additional fuel and air-fuel mixture into the rotor pocket for ignition and combustion within the rotor pocket and throughout the ignition-combustion chamber. Likewise, the supplemental conduit may deliver the compressed air-fuel mixture from the compression chamber to the high-pressure air-blast injector or injectors for ignition and combustion. The air-fuel mixture from the ignition injector may be ignited within the rotor pocket or begin before entry into the rotor pocket. The rotor pocket may have a pocket flange forming a pocket cup, or portion of the rotor pocket that extends forward from the leading edge of the rotor pocket opening. This pocket flange may be configured to capture air-fuel for combustion and direct the combustion reaction force into the direction of rotation, for improved power efficiency of the combustion.

The rotary combustion engine may also include one or more air channels extending from the compression chamber to the rotor pocket and some compressed air-fuel mixture may be forced, via the pressure within the trailing compression chamber into the leading chamber for ignition and combustion. An air channel may be configured within the housing, such as a housing air channel that is a channel extending into the interior surface of the housing and/or in the rotor face as a rotor air channel, a channel extending into the exterior surface of the rotor face. A rotor air channel length may be configured as an offset distance from the trailing edge of rotor face. The air channel or channels may be narrower than the rotor pocket and may form a conduit for the flow of air or air-fuel mixture from the compression chamber to the ignition-combustion chamber. This air channel keeps the trailing compression chamber from over pressurizing the supplemental air-fuel conduit that feeds the ignition injector. The pocket volume will be equal to or smaller in size than that needed to give an engine compression ratio, as described herein. An air channel may be configured in one or both of the rotor and the housing.

The rotary combustion engine may comprise one or more of ignition injectors that injects an air-fuel mixture into the housing, such as into the rotor pocket when it is configured as the ignition-combustion chamber. The ignition injectors may be configured to direct the air-fuel mixture into the rotor pocket, such as into the pocket cup, under the pocket flange. A pair of ignition injectors may be configured to inject the air-fuel mixture such that the two streams collided within the pocket cup, and preferably behind the thrust nozzle for more complete combustion.

A thrust nozzle may be configured within the rotor pocket to direct the flow of combusting air-fuel mixture back toward the trailing edge of the rotor pocket to enhance torque. Flow directors may be configured proximal to the inlet of the thrust nozzle to provide less resistance of the flow into the thrust nozzle and therefore high power conversion from combustion to torque.

The rotor has an integral rotor gear that is meshed with the fixed gear, whereby rotation of the rotor and the rotor gear about the fixed gear, rotates a shaft that passes through the center of the fixed gear. The fixed gear is fixed in location with respect to the side housing and the rotor gear eccentrically orbits about the fixed gear. This eccentric orbital motion enables the rotor to form chambers with the interior surface of the housing.

The rotary combustion engine may be a Wankel engine having a rotor with three faces. Each of these faces has a leading edge and a trailing edge, or junction between adjacent faces about the perimeter of the rotor. The three rotor faces may have a contour or curvature to enable smooth rotation along and within the interior of the housing. An inflection point in this curvature between adjacent faces forms the leading and trailing edges of each face and is the location of the apex seals of the rotary engine. A leading edge of the rotor is the leading edge with respect to the rotation of the rotor, wherein the leading edge is advanced or rotated past a fixed point of the housing, such as the intake port, before the trailing edge.

The rotor and particularly the rotor pocket may include a catalytic material configured to enhance autoignition and may be configured as a coating on the surface of the rotor pocket, for example. Catalytic materials may include platinum, hexaaluminates, bimetallic palladium, Cu—Cr—Zr alloys and garnets.

This combination of fuel injection configuration into the rotor cup enables a wide range of fuel types that can be used with this engine.

An exemplary rotary engine may comprise a rotor pocket that is fluidly coupled with a rotor air channel that extends from the rotor pocket toward the trailing edge of the exterior surface of the rotor. The rotor air channels may have an open portion that is open on the exterior surface of the rotor and a closed portion that forms a conduit within the rotor. The closed portion of the rotor air channel extends to the rotor pocket and may extend to an outlet that is in the pocket cup, or under the pocket flange. The open portion of the rotor air channel may be configured to receive compressed air or compressed air-fuel mixture from the trailing compression chamber as the rotor rotates within the housing. The open portion may have a length, width and be positioned to produce a rush of compressed air-fuel mixture into the rotor pocket to initiate combustion of the air-fuel mixture at the correct time or rotational position for driving the rotor within the housing. The compressed air-fuel mixture may force additional fuel from within a fuel reservoir coupled with the rotor air channel, and into the rotor pocket cup.

The additional fuel may be supplied to the fuel reservoir by a rotor-gear fuel conduit that receives fuel through a rotor-gear fuel transfer valve that is automatically opened when the rotor gear engages with a fixed gear tooth on a fixed gear mounted on the side housing, for example. The fuel flows through the rotor-gear fuel transfer valve and through the rotor-gear fuel conduit to the fuel reservoir, wherein it is subsequently forced by the rush of compressed air-fuel mixture through the rotor air channel and into the rotor pocket cup. A pocket cup check valve may be configured proximal to the outlet of the rotor air channel in the rotor pocket cup to prevent combusted gasses from blowing back into the rotor air channel. This configuration may be configured in and on each of the rotor faces.

Additional fuel may also be supplied to the fuel reservoir by a side-wall fuel transfer conduit that receives fuel through a side-wall fuel transfer port. The fuel flows through the side-wall fuel transfer port and through the side-wall fuel conduit to the fuel reservoir, wherein it is subsequently forced by the rush of compressed air-fuel mixture through the rotor air channel and into the rotor pocket cup. This configuration is configured in and on each of the rotor faces.

A plurality of rotor air channels may be configured in each of the rotor faces and form separate conduits within the rotor to enable high pressure and high flow rates of the air-fuel mixture to the rotor pocket cup that are directed to collide with each other to more effectively ensure combustion. The open portion of the rotor air channel form the rotor air channel inlet, which may be offset from the trailing edge by an air channel offset distance. This offset distance and the length of the open portion of the rotor air channel may produce compressed air-fuel mixture flow through the rotor air channel, through the fuel reservoir, into the rotor pocket and may flow under the pocket flange into the rotor pocket cup. When two or more rotor air channels are configured in a rotor face, the outlets of these rotor air channels may be configured toward each other to direct the blast of air-fuel mixture to collide and therefore initiate combustion and enhance more complete combustion.

The summary of the invention is provided as a general introduction to some of the embodiments of the invention and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

FIG. 4 shows a first face view of the rotor having a rotor pocket that is fluidly coupled with rotor air channels.

FIG. 5 shows a side view of a rotor having a first, second and third face, each having a rotor pocket proximal to the leading edge and a rotor air channel that extends therefrom toward the trailing edge.

FIG. 6 shows a top view of an exemplary thrust nozzle.

FIG. 7 shows a first face view of the rotor having a rotor pocket that is fluidly coupled with rotor air channels that have an open portion, open to the rotor face, and a closed portion that extends as a conduit from the open portion, through a fuel reservoir, and on to the rotor pocket cup. A check valve, may be configured to prevent combusted gasses from blowing back into the rotor air channel. Side-wall fuel conduits not shown for clarity and are shown in FIG. 9.

FIG. 8 shows a side view of a rotor having a first, second and third face, each having a rotor pocket proximal to the leading edge and a rotor air channel that extends therefrom toward the trailing edge.

Figure 1:
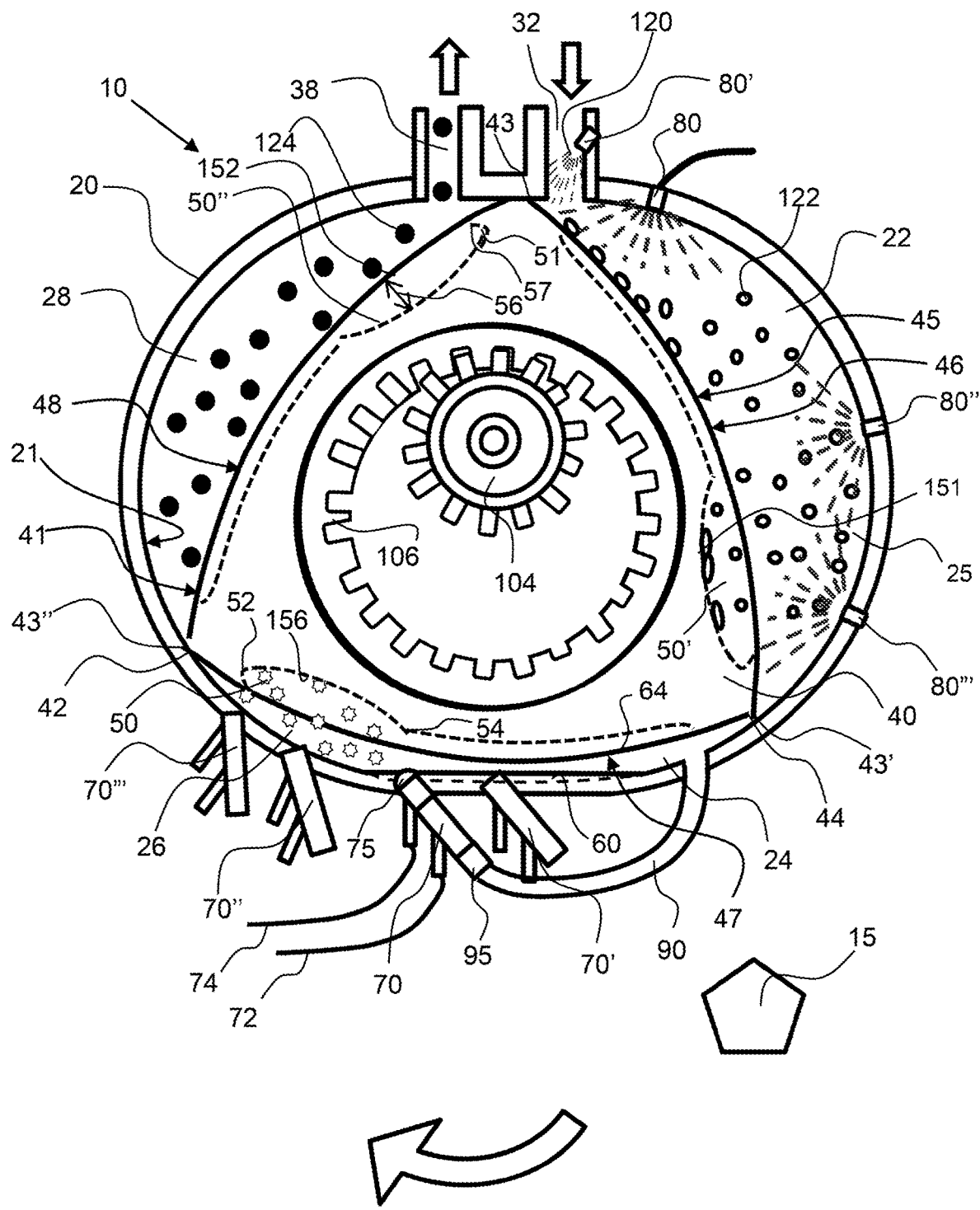
FIG. 1 shows a cross-section view of an embodiment of the invention wherein the rotor is shown in a first orientation.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 2:
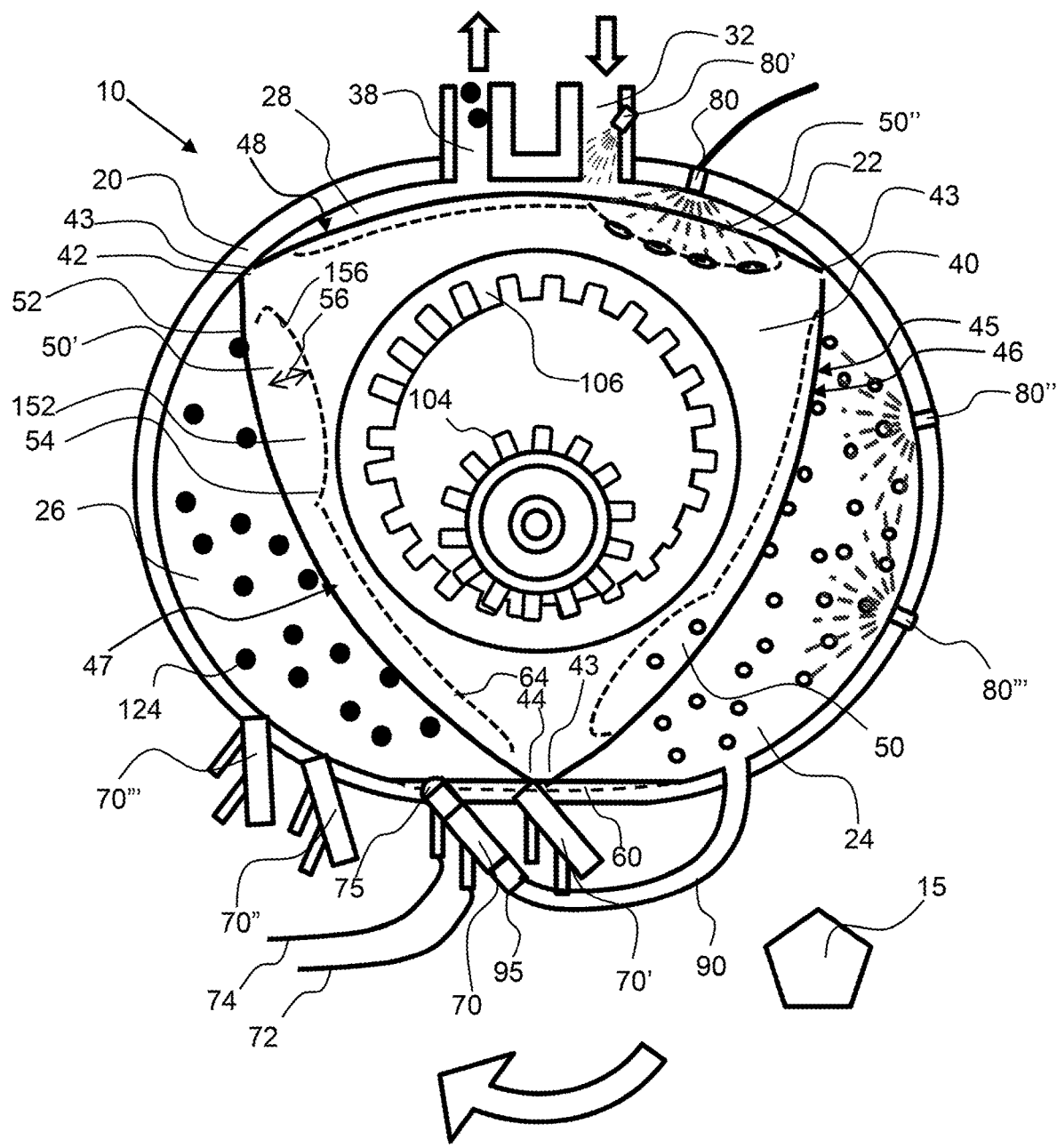
FIG. 2 shows a cross-section view of an embodiment of the invention wherein the rotor is shown in a second orientation.
Figure 3:
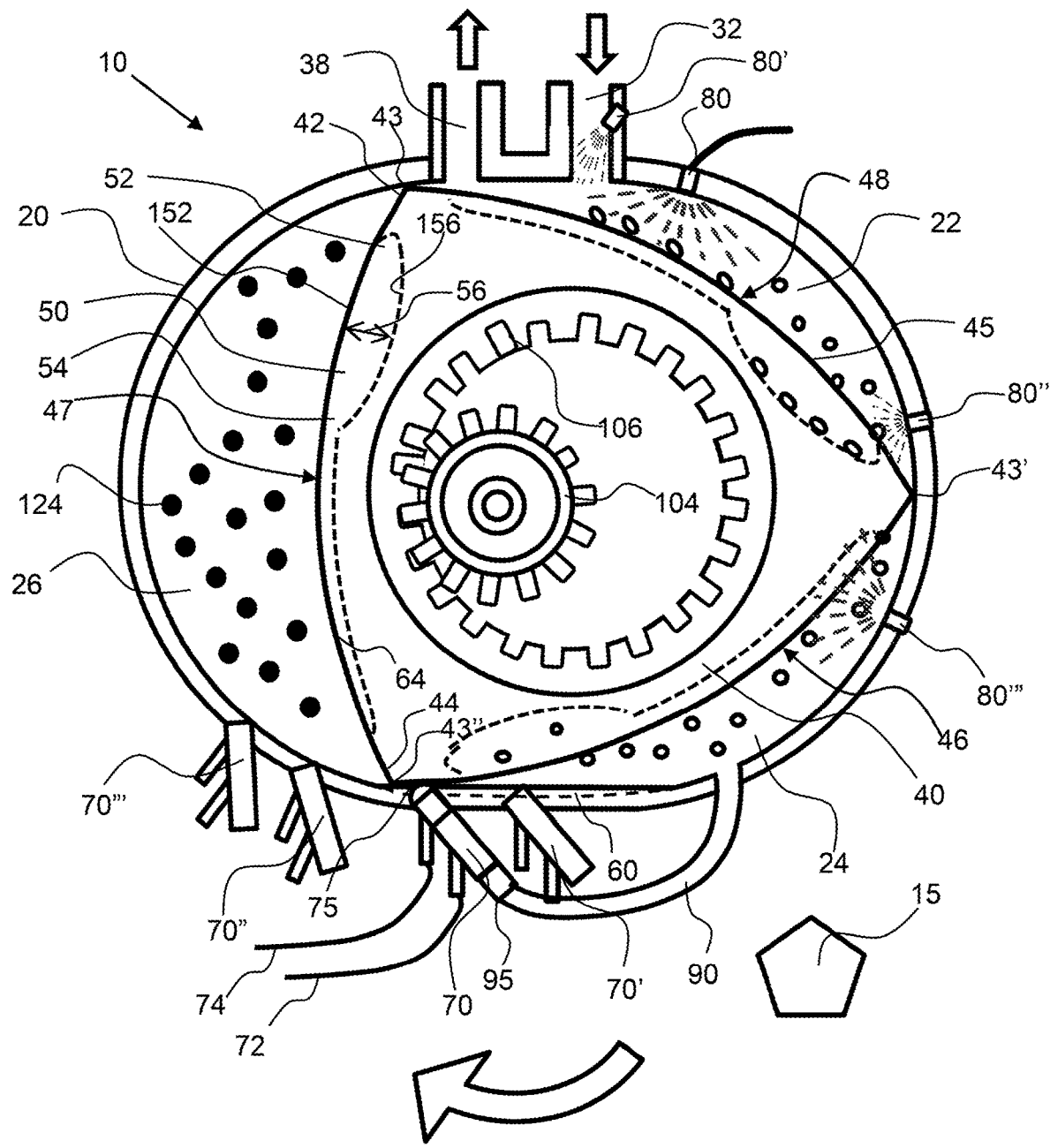
FIG. 3 shows a cross-section view of an embodiment of the invention wherein the rotor is shown in a third orientation.

FIGS. 1-3 show front cross-section views of the rotary engine 10, wherein the rotor 40 is shown in three different orientations. The orientations of the rotor 40 in FIGS. 1-3 show the rotary engine at various points in time while the rotary engine is in use. The rotor gear 106 is also shown in various orientations in FIGS. 1-3, since the rotor gear 106 orbits with the rotor 40 while the housing 20 and fixed gear 104 remain stationary in position with respect to each other. A shaft that passes through the center of the fixed gear is rotated by the rotation of the rotor about the fixed gear. The various orientations of the rotor 40 within the housing 20 create various chambers, which are described further herein. A plurality of chambers are formed between the exterior surface 41 of the rotor 40 and the interior surface 21 of the housing 20.

With reference to FIG. 1, a front cross-section view of the rotary engine 10 is shown. The rotary engine 10 comprises a rotor 40 shown in a first orientation. The rotor is encased within a housing 20. The rotor comprises a plurality of rotor faces 45, including a first rotor face 46, a second rotor face 47, and a third rotor face 48. The rotor further comprises an integral rotor gear 106 that is in mesh with a fixed gear 104. The rotor gear 106 orbits about the fixed gear 104 to maintain rotor position relative to the outer housing thus forming dynamic chambers between the inside surface of the housing and the rotor faces. Apex seals 43, 43', 43" effectively seal these dynamic chambers from each other. The chambers include the intake chamber 22 that receives air through the intake port 32, the compression chamber 24 wherein an air-fuel mixture 122 is compressed from the intake chamber, an ignition-combustion chamber 26 formed between the rotor pocket and the interior surface of the housing, and finally an exhaust chamber 28 that is fluidly coupled with the exhaust port 38 to expel combusted fuel gases 124 from the housing. The largest volume formed by the intake chamber as the rotor rotates within the housing minus the smallest volume, defines a swept volume 25.

As shown in FIG. 5, each rotor face comprises a leading edge 42 and a trailing edge 44. The leading edge 42 of a rotor face 45 is the edge of said rotor face that first passes a fixed position on the housing during rotation and the trailing edge is the edge, for said rotor face, that passes said fixed position after the leading edge. Each of the rotor faces have a curved surface and there is a sharp contour change or inflection point between the three rotor faces to produce the leading and trailing edges. Put another way, if the rotor 40 is moving clockwise within the housing 20, the leading edge 42 of each rotor face 45 is the most clockwise portion of said rotor face 45, and the trailing edge 44 of each rotor face 45 is the most counterclockwise portion of said rotor face 45.

Each rotor face 46, 47, 48 comprises a rotor pocket 50, 50', 50" respectively configured near the leading edge 42 of each rotor face 45. The details of the rotor pocket and rotor cup are best shown in FIGS. 4 and 5. Each rotor pocket 50, 50', 50" also comprises a pocket opening 152, 152', 152" respectively, in the rotor face to the rotor pocket having a leading edge 52, 52', 52" and a trailing edge 54, 54', 54" respectively. As shown for rotor pocket 50', the leading edge 52' of the rotor pocket opening 152' is closer to the leading edge 42' of the second rotor face 47, than the trailing edge 54' of the rotor pocket opening 152' and the trailing edge 44' of the rotor face. The depth 56 of each rotor pocket is the furthest linear distance from the outside edge of the rotor face 45 to the inside edge of the rotor pocket 50. Each rotor pocket may have a pocket cup 51 configured under a pocket flange 57 that extends along the rotor face over the pocket cup to the leading edge 52 of the pocket opening 152 in the rotor face. The pocket cup is configured proximal to the leading edge of the rotor face.

As shown in FIG. 1, the rotor 40 rotates within the housing 20, a plurality of dynamic chambers are formed, including the intake chamber 22, the compression chamber 24, the ignition-combustion chamber 26, and the exhaust chamber 28. Air enters the housing 20 via the intake port 32 and passes into the intake chamber 22. As shown, an intake spray injector 80' may be configured to inject a fuel spray 120 into the intake port, into the intake chamber 22, onto the rotor face 45 and pocket surface 151. Additional intake spray injectors 80, 80", 80''' may be configured to inject fuel into the intake chamber and particularly onto the rotor face 45 and also onto the rotor pocket surface 151. This injected fuel may cool the rotor by evaporation of the fuel from the rotor and pocket faces. An air-fuel mixture 122 is created within the intake chamber from the injection of liquid fuel into the intake chamber by the intake spray injector(s). The rotation of the rotor 40 within the housing 20 allows air to flow into the intake chamber 22. Further rotation of the rotor 40 within the housing 20 creates the compression chamber 24, wherein the air-fuel mixture is compressed, as shown in FIG. 2. The compression chamber is formed clockwise from the intake chamber, as the rotor is rotating in a clockwise direction.

The air-fuel mixture is trapped within the ignition-combustion chamber 26 as the rotor rotates to close off the ignition-combustion chamber along the interior surface of the housing 20, as shown in FIG. 1. Additional compression chamber gas from the compression chamber 24 may be fed through the supplemental air-fuel conduit 90 into the ignition injector 70, further into ignition-combustion chamber 26 and rotor pocket 50 for combustion. The supplemental air-fuel conduit 90 may be coupled with a check valve 95 to ensure that air-fuel mixture, or combusted gasses does not flow back into the ignition injector 70 and into the supplemental air-fuel conduit 90.

The combusted air-fuel mixture forces the rotor to orbit about the fixed gear and expands to further move the rotor 40 in a rotary manner and thus rotate an eccentric shaft that passes through the center of the fixed gear 104. The rotor face 48 displaces the combusted fuel gases 124 out of the exhaust chamber 28 and into the exhaust port 38, as best shown in FIG. 1. Further rotation of the rotor 40 causes the combusted gasses to move out of the exhaust chamber 28, then out of the housing 20 via the exhaust port 38 as shown in FIG. 2.

The various chambers described herein are formed by the rotor faces 46, 47, 48 and the housing 20. In FIG. 1, the intake chamber 22 is formed by the first rotor face 46, the compression chamber 24 and ignition-combustion chamber 26 are formed by the second rotor face 47, and the exhaust chamber 28 is formed by the third rotor face 48.

The housing may comprise a housing air channel 60 that extends from the compression chamber 24 to the ignition-combustion chamber 26. Also, each rotor face 45 may comprise one or more rotor air channels 64 that exists as a recess space from the rotor face or conduit within the rotor face. The air channel(s) extend from the pocket trailing edge 54 of the rotor pocket 50 towards the trailing edge 44 of the rotor face 45, as shown in FIGS. 1, 4 and 5. Note that the air channel may include a rotor air channel and/or a housing air channel as described herein.

With reference to FIG. 1, the housing 20 may further comprise one or more intake spray injectors 80, 80', 80", 80''' configured to introduce a fuel spray into the intake chamber, such as along the face of the rotor and in particular into the rotor pocket to effectively cool the rotor and/or rotor pocket through evaporative cooling. An intake spray injector 80 may be located proximal to the intake port 32. An intake spray injector 80' may be configured to inject fuel into the intake port. A plurality of additional intake spray injectors 80", 80''' may be configured to spray fuel within the housing 20 and along the intake chamber 22 and/or beginning of the compression chamber 24. The housing 20 further comprises ignition injectors 70, 70', 70", 70''' configured to inject fuel into the ignition-combustion chamber 26 and rotor pocket 50. The ignition injector 70 could include an ignitor 75 that initiates the ignition of the high-pressure air-fuel mixture from the ignition injector, in order to combust the air-fuel mixture to rotate the rotor 40. A fuel line 72 and an electrical line 74 are coupled with the ignition injector(s) to provide fuel to the ignition injector(s) and to provide an electric supply for the ignitor 75, respectively. A controller 15 may be coupled with the fuel and/or electrical lines and be configured to adjust the exact timing and fuel volume of the injections. A supplemental air-fuel conduit(s) 90 extends from the compression chamber 24 to the ignition injector(s) 70 and may be configured to supply compressed gas from the compression chamber to the ignition injector(s). A check valve 95 is configured to prevent backflow of combusted gases into the ignition injector(s) and supplemental air-fuel conduit(s). The check valve is a one-way flow valve that allows fluid to flow from the compression chamber 24 to the ignition-combustion chamber 26, but not from the ignition-combustion chamber 26 to the supplemental air-fuel conduit and back into the compression chamber 24.

With reference to FIG. 2, a front cross-section view of the rotary engine 10 is shown. The rotary engine 10 comprises the rotor 40 of FIG. 1 shown in a second orientation. In this orientation, the intake chamber 22, compression chamber 24, ignition-combustion chamber 26, and exhaust chamber 28 are formed. The intake chamber 22 and exhaust chamber 28 are formed by the third rotor face 48 and fuel is being injected into the rotor pocket 50". The compression chamber 24 is formed by the first rotor face 46, and the ignition-combustion chamber 26 is formed by the second rotor face 47.

With reference to FIG. 3, a front cross-section view of the rotary engine 10 is shown. The rotary engine 10 comprises the rotor 40 of FIGS. 1 and 2 shown in a third orientation. In this orientation, the intake chamber 22, compression chamber 24, ignition-combustion chamber 26 are formed. The orientation shown in FIG. 3 is after the rotor 40 has rotated clockwise from the orientation shown in FIG. 2. The intake chamber 22 is formed by the third rotor face 48, the compression chamber 24 is formed by the first rotor face 46, and the ignition-combustion chamber 26 is formed by the second rotor face 47. All other components of the rotary engine 10 illustrated and described in FIGS. 1 and 2 are shown in FIG. 3, except exhaust chamber.

Referring now to FIGS. 4 and 5, a rotor 40 has a first face 46, a second face 47 and a third face 48, each having a rotor pocket 50, 50', 50", proximal to the leading edge 42, 42', 42" and a rotor air channel 64, 64', 64" that extends therefrom toward the trailing edge 44, 44', 44", respectively. The rotor pocket has a depth 56 that is greater than a rotor air channel depth 66. As shown in FIG. 4, the width 53 of the rotor pocket 50 is greater than the width 65 of the rotor air channels 64L, 64R. Also, each rotor pocket has a pocket flange 57, 57', 57", or portion forming the pocket cup 51, the volume of pocket space that is forward or more proximal to the leading edge 42 of the rotor face, than the leading edge 52 of the rotor pocket opening 152, the intersection of the rotor pocket with the exterior surface 41 of the rotor face. As described herein, this pocket flange space may be configured to receive the air-fuel mixture from one or more ignition injectors, enhance mixing and combustion of the fuel and direct a force of combustion onto the rotor for improved power and efficiency. As shown, a pair of ignition injectors 70L, 70R are configured to inject air-fuel mixture into the rotor pocket 50, such that it is directed under the pocket flange 57 and into the pocket cup 51 for mixing and combustion. The two injected streams of air-fuel mixture are guided to intercept each other in the pocket, under the pocket flange and preferably along the leading edge of the pocket cup. The rotor air channel may have a greater length 67 than the length 55 of the rotor pocket. However, in some embodiments the length of the rotor pocket may be about the same or even greater than the length of the rotor air channel. As shown, the rotor pocket is offset from the leading edge 42 by a pocket offset distance 49. Likewise, the rotor air channel 64 is offset from the trailing edge 44 by a channel offset 68 having a channel offset distance 69.

A catalytic material 156 may be configured on the rotor and may be preferentially configured in the rotor pocket to aid in autoignition and may be configured as a coating on a portion of the rotor pocket.

Referring now to FIGS. 4 to 6, a thrust nozzle 99 configured in the rotor pocket 50 directs combustion gasses through the thrust nozzle to produce a force on the rotor 40. The thrust nozzle is not shown in FIGS. 1 to 3 for clarity purposes only. The thrust nozzle may be configured proximal to the leading edge 52 of the rotor pocket opening and at least partially under the pocket flange 57, in each of the rotor pockets. The thrust nozzle has an expanding conduit 97 that expands in cross-sectional area from an inlet 96 to an outlet 98 and this may be configured with the inlet closer to the leading edge 42 of the rotor face than the outlet, such that the thrust nozzle exhaust, as indicated by the large bold arrow extending from the thrust nozzle outlet, is counter to the rotation of the rotor. This configuration will produce a thrust force on the rotor, in the direction of rotation, to propel the rotor. The high-pressure nozzle of the ignition injectors 70L, 70R may be configured to inject an air-fuel mixture 122 stream into the rotor pocket such that the two streams are directed to flow around the thrust nozzle and collide under the pocket flange 57, in the pocket cup 51, where they combust and flow through the thrust nozzle. Combustion of the air-fuel mixture 122 at the leading edge of the rotor pocket and in the pocket cup forces combustion gasses through the thrust nozzle and thereby may produce more torque and propulsion. The direction of the air-fuel mixture streams is indicated by bold lines extending from the ignition injectors. Some flow of the combustion gases may flow around the thrust nozzle as well, but with proper contour shaping may also produce some thrust, thereby may produce more torque and propulsion.

As best shown in FIG. 6, flow directors 93, 93' are configured proximal to the inlet 96 of the thrust nozzle 99 to ensure the smooth, low loss flow of gases into the conduit 97 of the thrust nozzle.

Referring now to FIGS. 7 and 8, an exemplary rotary engine 10 may comprise a rotor pocket 50 having a rotor pocket cup 51 that is fluidly coupled with a rotor air channel 64 that extends from the rotor pocket toward the trailing edge 44 of the exterior surface 41 of the rotor 40. The rotor air channels 64L and 64R, shown in FIG. 7, may have an open portion 61L, 61R that is open on the exterior surface 41 of the rotor 40 and a closed portion 63L, 63R that forms a conduit into the rotor 40. The closed portion of the rotor air channel extends to the rotor pocket 50 and as shown extends to an outlet that is in the pocket cup 51, or under the pocket flange 57. The open portion of the rotor air channel may be configured to receive compressed air or compressed air-fuel mixture from the compression chamber 24 (Reference FIG. 1), as the rotor rotates within the housing 20 (Reference FIG. 1). The open portion may have a length 62 and be positioned to produce a blast or rush of compressed air-fuel mixture into the rotor pocket 50 and preferably into the rotor pocket cup 51, to initiate combustion of the air-fuel mixture at the correct time or rotational position for driving the rotor within the housing. The compressed air-fuel mixture may force fuel within a fuel reservoir 86, coupled with the rotor air channel 64, into the rotor pocket cup 51. Each of the rotor faces includes a rotor air channel 64 extending from the preceding compression chamber, in use, to the rotor pocket 50 and a respective rotor-gear fuel conduit 84 extending from a rotor-gear fuel transfer valve to the rotor air channel and a side-wall fuel conduit 82 extending from a side wall fuel transfer port 83 to the rotor air channel fuel reservoir 86. The rotor air channels shown in the rotor of FIGS. 7, 8 and 9, may be included in the with the features as shown in FIGS. 1 to 3.

The fuel in reservoir 86 may be supplied by a rotor-gear fuel conduit 84 that receives fuel through a rotor-gear fuel transfer valve 85 that is automatically opened when the rotor gear 106 engages with a fixed gear 104 tooth, for example. The fuel flows to the fuel reservoir 86, wherein it is subsequently forced by the rush of compressed fuel-air mixture through the rotor air channel 64 into the rotor pocket cup 51. A pocket cup check valve 87, configured proximal to the outlet of the rotor air channel into the rotor pocket cup, prevents combusted fuel from blowing back into the rotor air channel. This configuration is configured in and on each of the rotor faces 45.

Figure 9:
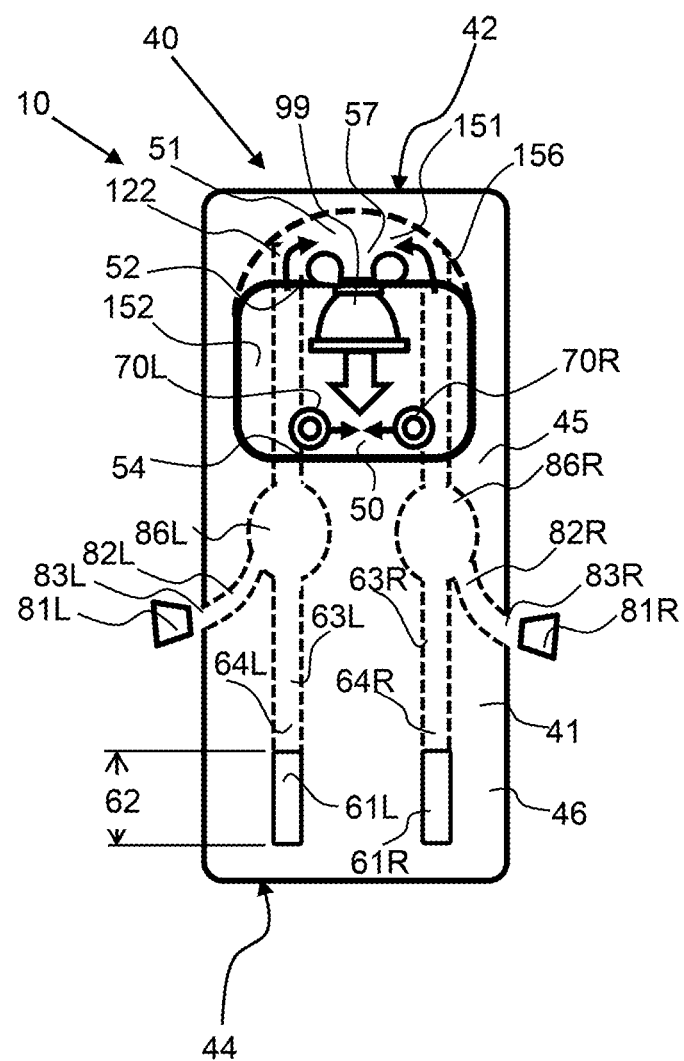
FIG. 9 shows a first face view of the rotor shown in FIG. 7 but with the side-wall fuel conduits shown.

Referring now to FIG. 9, fuel may also be supplied to the fuel reservoir 86 by a side-wall fuel transfer conduit 82 that receives fuel through a side-wall fuel transfer port 83, from a housing side-wall injector 81 in the side wall of the housing. The fuel flows through the side-wall fuel transfer port 83 and through the side-wall fuel conduit 82 to the fuel reservoir 86, wherein it is subsequently forced by the rush of compressed air-fuel mixture through the rotor air channel 64 into the rotor pocket cup 51. This configuration is configured in and on each of the rotor faces 45.

The rotor air channels 64L, 64R form two separate conduits within the rotor 40 to enable high pressure and high flow rates of the air-fuel mixture to the rotor pocket cup 51 that are directed to collide with each other to more effectively ensure combustion. The open portion 61 of the rotor air channel 64 form the rotor air channel inlet 611, which may be offset from the trailing edge by an air channel offset distance 69. This offset distance and the length 62 of the open portion 61 of the rotor air channel 64 produces compressed air-fuel mixture flow into the rotor pocket cup 51.

As shown in FIG. 9, with reference to FIG. 8, the rotor 40 has a pair of side-wall fuel conduits 82R, 82L that extend from respective side-wall fuel transfer ports 83R, 83L, or openings in the side wall, for receiving fuel from the housing side-wall injectors 81R, 81L. The side-wall fuel conduits extend from the side-wall fuel transfer ports to the respective fuel reservoir 86R, 86L. The open portion 61R, 61L of the rotor air channels 64R, 64L receives compressed air-fuel mixture that is forced through the closed portion 63R, 63L to force the fuel from the respective fuel reservoir 86R, 86L into the pocket cup 51.

The It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A rotary engine comprising:
   a) a rotor comprising three faces, each face comprising:
      i) a leading edge;
      ii) a trailing edge;
      iii) a rotor pocket configured as a recess in said face; and
      iv) a rotor air channel extending from the rotor pocket toward the trailing edge of said face, wherein in operation, the rotor air channel extends from the compression chamber to the ignition-combustion chamber;
   b) a housing configured around the rotor;
      wherein rotation of the rotor within the housing forms a plurality of chambers comprising:
         an intake chamber;
         a compression chamber;
         an ignition-combustion chamber; and
         an exhaust chamber;
      wherein the rotor is configured to rotate eccentrically within the housing;
   c) an intake port for receiving an intake flow into the intake chamber; and
   d) an exhaust port for exhausting combusted fuel out of the exhaust chamber;
      wherein fuel is provided to said ignition-combustion chamber to produce combustion; and
      wherein the rotor rotating within the housing forms said intake chamber that extends from the intake port to the compression chamber, and said ignition-combustion chamber that extends between the compression chamber and the exhaust chamber and said exhaust chamber that extends to the exhaust port.

2. The rotary engine of claim 1, wherein the rotor air channel has an open portion and a closed portion, wherein the open portion is open on the face and wherein the closed portion extends as a conduit in the rotor from the open portion to the rotor pocket.

3. The rotary engine of claim 2, further comprising a rotor-gear fuel transfer valve and a rotor-gear fuel conduit that couples the rotor-gear fuel transfer valve to the rotor air channel.

4. The rotary engine of claim 3, further comprising a fuel reservoir fluidly coupled with the rotor air channel, and wherein the rotor-gear fuel conduit is fluidly coupled with said fuel reservoir.

5. The rotary engine of claim 3, further comprising a fixed gear and wherein the rotor rotates about the fixed gear, and wherein the rotor-gear fuel transfer valve is configured on said rotor and configured to automatically open when the rotor rotates and the rotor-gear fuel transfer valve engages with the fixed gear.

6. The rotary engine of claim 4, further comprising a side-wall fuel transfer port and a side-wall fuel conduit that is coupled between the side-wall fuel transfer port and the rotor air channel.

7. The rotary engine of claim 6, further comprising a fuel reservoir fluidly coupled with the rotor air channel, and wherein the side-wall fuel conduit is fluidly coupled with said fuel reservoir.

8. The rotary engine of claim 2, further comprising a side-wall fuel transfer port and a side-wall fuel conduit that is coupled between the side-wall fuel transfer port and the rotor air channel.

9. The rotary engine of claim 8, further comprising a fuel reservoir fluidly coupled with the rotor air channel, and wherein the side-wall fuel conduit is fluidly coupled with said fuel reservoir.

10. The rotary engine of claim 1, comprising a plurality of said rotor air channels.

11. The rotary engine of claim 10, wherein each of the rotor air channels has an open portion and a closed portion, wherein the open portion is open on the face and wherein the closed portion extends as a conduit in the rotor from the open portion to the rotor pocket.

12. The rotary engine of claim 11, wherein an outlet of a first rotor air channel and an outlet of a second rotor air channel are configured to direct respective air-fuel mixture to collide in the rotor pocket to enhance combustion.

13. The rotary engine of claim 12, wherein the rotor pocket comprises a pocket cup on a leading end of the rotor pocket and having a pocket flange over the pocket cup and wherein the outlets of the first and second rotor air channels are configured in the pocket cup and under the pocket flange.

14. The rotary engine of claim 1, further comprising a thrust nozzle configured within the rotor pocket and comprising a conduit that expands in cross sectional dimension from an inlet to an outlet to create thrust on the rotor when the air-fuel mixture is combusted and passes through the thrust nozzle.

15. The rotary engine of claim 14, wherein the inlet of the thrust nozzle is configured more proximal to the leading edge of the rotor face than the outlet of the thrust nozzle.

16. The rotary engine of claim 15, wherein the rotor pocket comprises a pocket cup on a leading end of the rotor pocket and having a pocket flange over the pocket cup, and
 wherein the thrust nozzle is configured at least partially under the pocket flange and at least partially within the pocket cup.

17. The rotary engine of claim 1, wherein each of the rotor pockets has a depth configured to form a volume producing a minimum compression ratio of 5 to 1.

18. The rotary engine of claim 1, wherein each of the rotor pockets has a volume that is at least 25% of a swept volume.

19. The rotary engine of claim 1, further comprising an intake spray injector that sprays fuel onto the rotor and into the rotor pocket to cool the rotor.

20. The rotary engine of claim 1, further comprising an ignitor configured to ignite the air-fuel mixture in the rotor pocket.

21. The rotary engine of claim 1, further comprising an ignition injector that is configured to inject an air-fuel mixture into said rotor pocket when said rotor pocket is in the ignition-combustion chamber position.

22. The rotary engine of claim 1, further comprising an eccentric gearing assembly comprising:
 a) a rotor gear affixed to the rotor; and
 b) a fixed gear;
  wherein the rotor gear is configured around the fixed gear and is configured to be driven to move the rotor eccentrically around the fixed gear.

* * * * *